United States Patent
Chang et al.

(10) Patent No.: US 7,810,517 B2
(45) Date of Patent: Oct. 12, 2010

(54) MULTIPLE-INPUT GAS ADJUSTER

(75) Inventors: Pao-Chi Chang, Shihgang Township, Taichung County (TW); Sen-Yu Wu, Shengang Township, Taichung County (TW); Shu-Mei Liu, Shihgang Township, Taichung County (TW)

(73) Assignee: Seven Universe Industrial Co., Ltd., Taichung County (TW)

( * ) Notice: Subject to any disclaimer, the term of this patent is extended or adjusted under 35 U.S.C. 154(b) by 345 days.

(21) Appl. No.: 11/953,719

(22) Filed: Dec. 10, 2007

(65) Prior Publication Data
US 2009/0120513 A1 May 14, 2009

(51) Int. Cl.
*G05D 16/02* (2006.01)

(52) U.S. Cl. .............. 137/505.18; 137/505.46; 137/601.02

(58) Field of Classification Search ............ 137/505.18, 137/505.46, 505.47, 601.02
See application file for complete search history.

(56) References Cited

U.S. PATENT DOCUMENTS

| | | | | |
|---|---|---|---|---|
| 890,238 A * | 6/1908 | Kenton | ................. | 137/254 |
| 911,249 A * | 2/1909 | Lulli | ................. | 137/505.46 |
| 1,816,431 A * | 7/1931 | Helf | ................. | 137/506 |
| 2,601,745 A * | 7/1952 | Cruzan | ................. | 137/505.38 |
| 3,854,663 A * | 12/1974 | Goldsberry | ................. | 236/92 C |
| 7,341,074 B2 * | 3/2008 | Pechtold | ................. | 137/505.42 |

* cited by examiner

*Primary Examiner*—Stephen Hepperle
(74) *Attorney, Agent, or Firm*—Ming Chow; Sinorica, LLC

(57) ABSTRACT

A multiple-input gas adjuster includes a case having a chamber therein, an input channel, an output channel communicated with the chamber, a first input bore and a second input bore communicated with the input channel and the chamber. A pressure adjusting mechanism has a film assembly, a movable shaft to be reciprocated by the film assembly, a swing device pivoted in the case with an end thereof connected to the movable shaft and an opposite end for sealing the second input bore, and a driving device received in the first input bore and connected to the movable shaft for reciprocation to seal the first input bore. High pressure gas may flows into the first and second input bores through the input channel for pressure adjusting operation. With the action of the pressure adjusting mechanism, the present invention provides a well pressure reducing and stabilizing performance.

8 Claims, 6 Drawing Sheets ns, which is provided in the chamber of the case, having a film assembly in the case, a movable shaft in the case for reciprocation by the film assembly toward or away from the first input bore, at least a swing device pivoted in the case with an end thereof connected to the movable shaft and an opposite end to be moved to seal the second input bore, and a driving device received in the first input bore and connected to the movable shaft for reciprocation to seal the first input bore.

MULTIPLE-INPUT GAS ADJUSTER

BACKGROUND OF THE INVENTION

1. Field of the Invention

The present invention relates generally to a gas adjustor, and more particularly to a burner of a multiple-input gas adjuster.

2. Description of the Related Art

A conventional gas adjuster is provided on an outlet of a gas supply, such as gas barrel, to lower the pressure of the gas in the gas barrel to a normal pressure for gas stove. Such gas adjuster includes a case, an input channel on an end of the case, a gas bore on the case and communicated with the input channel, an output channel on an opposite end of the case, a adjusting film in the case to separate the space within the case into a upper chamber and a lower chamber, a pole through the adjusting film, an adjusting button on the case and associated with and upper and lower chambers, a elastic member beside the pole and between the adjusting button and the adjusting film to be moved by the adjusting button to change the flexibility of the adjusting film, and a pressure reducing device having a lever pivoted in the lower chamber with opposite ends connected to the pole and a valve plug, which associated with the gas bore. High pressure gas flows to the lower chamber, a pressure reducing room, via the input channel and the gas bore, where the high pressure gas moves away the lever, such that the gas pressure will be lower and the gas flows out via the output channel by the actions of the adjusting film, the elastic member and the lever.

When the gas in the lower chamber flows to a gas stove, the pressure in the lower chamber is reducing to have the elastic member moving the adjusting film and the pole downwards whereby the lever is moved to move the valve plug away from the gas bore. As a result, the high pressure gas will flow into the lower chamber to increase the gas pressure therein. While the gas pressure in the lower chamber increases to a specific value, it will move the adjusting film and the pole upward again to have the valve plug sealing the gas bore. Above actions will repeat in a short period to supply the gas stove gas with a constant pressure.

Such adjuster only has one time of pressure reducing, that is, gas flows to the gas stove from the lower chamber, so that the pressure variation is greater to make the flame of the gas stove unstable. To improve this drawback, an invention provides a gas adjuster which provides two times of pressure reducing. This gas adjuster provides a pressure reducing room and a pressure reducing mechanism connected to the input channel in series connection to provide two times of pressure reducing.

Such gas adjuster provides a stable gas supply, however, it has complex structure and high cost. As a result, we still find the one time pressure reducing gas adjuster.

SUMMARY OF THE INVENTION

The primary objective of the present invention is to provide a multiple-input gas adjuster, which has superior input gas pressure reducing function, stable gas output function under variable gas input, and stable gas output of high flow rate under a condition of the gas flow increasing from zero to maximum flow rate. The gas adjuster of the present invention overcomes all the drawbacks of the conventional gas adjusters as described above.

According to the objective of the present invention, a multiple-input gas adjuster includes a case having a chamber therein, an input channel at an end thereof, an output channel at opposite communicated with the chamber, a first input bore and at least a second input bore communicated with the input channel and the chamber; and a pressure adjusting mecha-

DETAILED DESCRIPTION OF THE INVENTION

Figure 1:
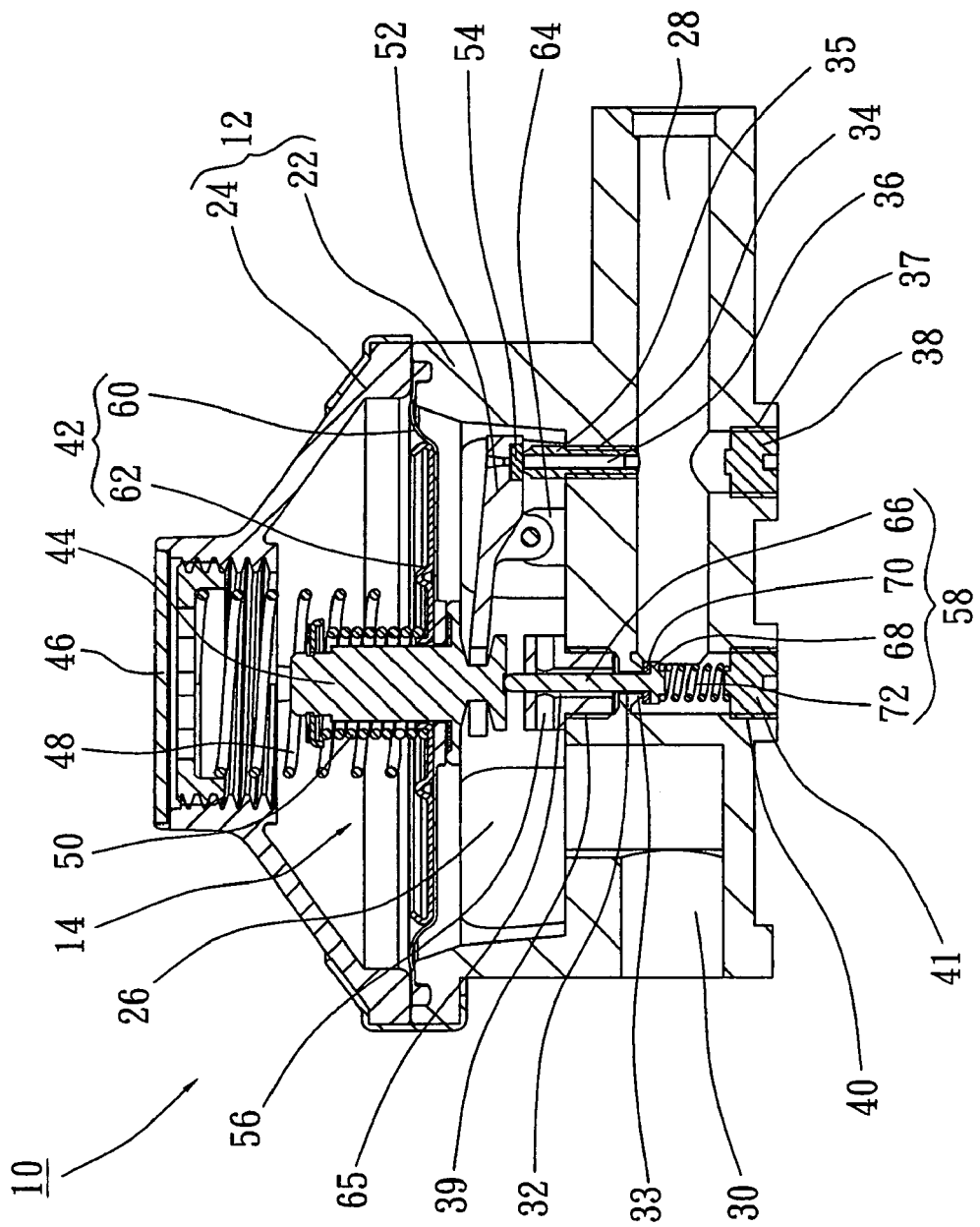
FIG. 1 is a sketch diagram of a first preferred embodiment of the present invention, showing the inside structure.

As shown in FIG. 1, a gas adjuster 10 of the first preferred embodiment of the present invention includes a case 12 and a pressure adjusting mechanism 14.

The case 10 has a main member 22 and a main lid 24. The main member 22, with an opening at a top, has a chamber 26 therein, an input channel 28 on a bottom thereof and an output channel 30 opposite to the input channel 28. The input channel 28 is connected to a gas supply, such as gas barrel, and the output channel 30 is connected to a gas stove. The main member 22 further has a first input bore 32 communicating an end of the input channel 28 and the chamber 26 and a through hole 34. One a sidewall of the first input bore 32 adjoining the input channel 28 is a cone-like protrusion 33. The through hole 34, which is a threaded hole, communicates the chamber 26 and the input channel 28. A ventilation device 35, which has a second input bore 36, is placed in the through hole 34. The main member 22 further is provided with an opening 37, which is a threaded hole, associated with the through hole 34. A lid 38 is screwed into the opening 37. Between the chamber 26 and the first input bore 32 is a positioning bore 39, which is a threaded hole too. The main member 22 further has an adjusting bore 41, which is a threaded hole, associated with the first input bore 32. An adjusting button 40 is screwed into the adjusting bore 41.

The pressure adjusting mechanism 14 includes a film assembly 42, a movable shaft 44, a knob 46, an adjusting spring 48, a pressure reducing spring 50, a swing device 52, a sealing block 54, a positioning base 56, and a driving device 58.

The film assembly 42, which seals the opening of the chamber 26, has a adjusting film 60 and a plate 62 laminated together.

The movable shaft 44 runs through the film assembly 42 to have an inner end associated with the first input bore 32.

The knob 46 is provided on the main lid 24 for free rotation.

The adjusting spring 48 has opposite ends urging the knob 46 and the film assembly 42.

The pressure reducing spring 50 is provided at an outer side of the movable shaft 44.

The swing device 52 is pivoted on a pivot base 64 in the chamber 26 with opposite ends connected to the movable shaft 44 and the ventilation device 35 respectively.

The sealing block 54 is provided on the end of the swing device 52 connecting the ventilation device 35 to seal the second input bore 36.

The positioning base 56 is secured in the positioning bore 39 of the main member 22. The positioning base 56 has a through bore 65 communicated with the first input bore 32.

The driving device 58 includes a shaft 66, a stop block 68, a leakage-proof device 70, and an elastic member 72. The shaft 66 is received in the first input bore 32 and the through bore 65 for reciprocation. The leakage-proof device 70 is provided on the end of the shaft 66 associated with the input channel 28. The elastic member 72 is a spring with opposite ends urging the stop block 68 and the adjusting button 40.

Figure 2:
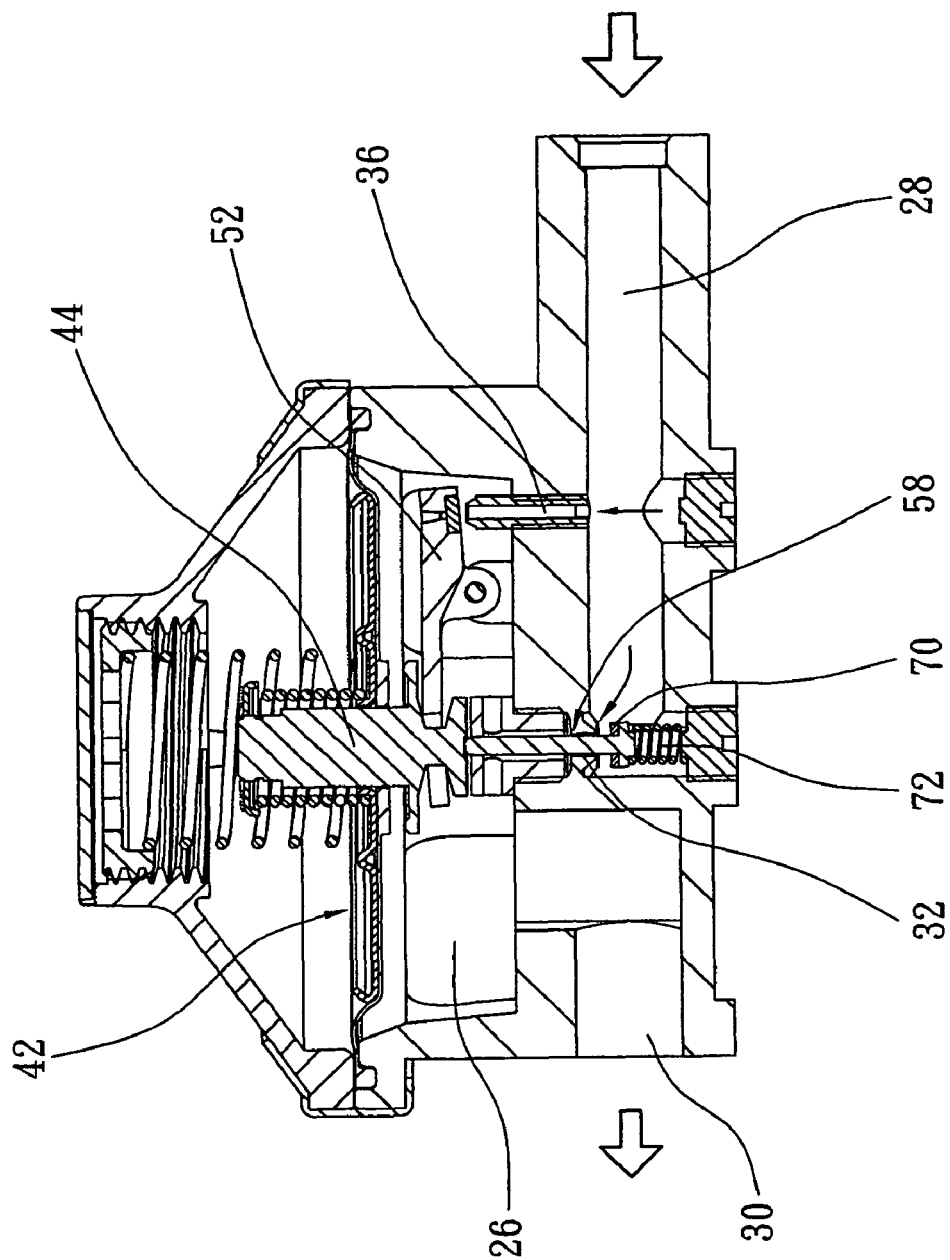
FIG. 2 is a sketch diagram of the first preferred embodiment of the present invention, showing the action of the pressure adjusting mechanism.

The actions and the functions of the gas adjuster 10 the present invention will be described hereunder:

As shown in FIG. 2, after the high pressure gas flows into the input channel 28 and into second input bore 36, the gas; enters the chamber 26. The gas pressure will overcome the spring force of the elastic member 48 urging the driving device 58 toward the first input bore 32. The swing device 52, which is moved by the gas pressure, moves the movable shaft 44 downward to press the driving device 58 downward and to move the leakage-proof device 70 away from the first input bore 32 that gas may flow into the chamber 26 via both of the first input bore 32 and the second input bore 36. While the pressure in the chamber 26 keeps raising, it will press the film assembly 42 upward and move the driving device 58 upward to move the movable shaft 44 upward and to turn the swing device 52 reversely for sealing the first input bore 32 and the second input bore 36.

When the gas stove connected to the gas adjuster 10 of the present invention burns, the gas in the chamber 26 flows out to lower the pressure therein. In such condition, the film assembly 42 and the movable shaft 44 will be moved downward by the adjusting spring 48 to turn the swing device 52 again that high pressure gas will flow into the chamber 26 via both of the first input bore 32 and the second input bore 36. Above actions will repeat in a very short period to keep the gas supplying to the gas stove in a stable condition.

Figure 3:
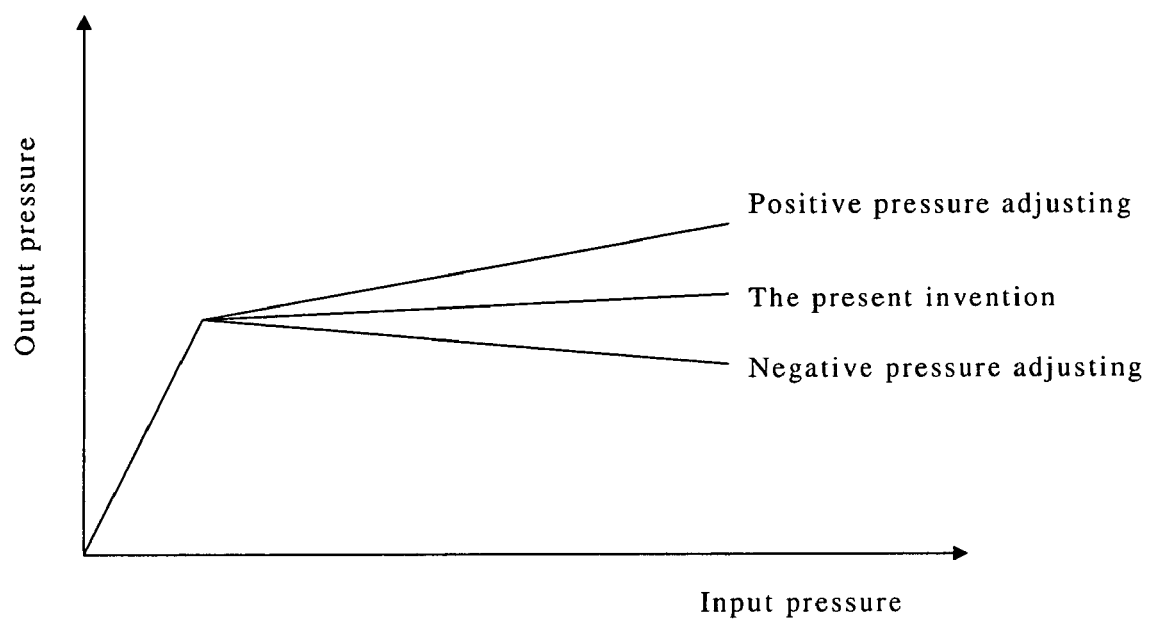
FIG. 3 is a graph of the first preferred embodiment of the present invention, showing the relationship of input gas pressure and output gas pressure.

The gas adjuster 10 of the present invention has both function of positive pressure adjusting, control gas entering from the second input bore 36, and negative pressure adjusting, stop gas entering from the first input bore 32, that provides a counteraction of a positive pressure adjusting curve and a negative pressure adjusting curve, as shown in FIG. 3. The present invention provides a more stable pressure than the conventional devices under a condition of variable gas input. The power of flow rate for multiple inputs will be superior to the conventional gas adjusters.

Besides, the lid 38 may be disassembled that user may operate a tool into the main member 22 via the opening 37 to turn the ventilation device 35 for adjustment of a height of the ventilation device 35 that may overcome the affect of the tolerance in manufacture. The adjusting button 40 may be turned also to change the spring force of the elastic member 72 urging the driving device 58.

Figure 4:
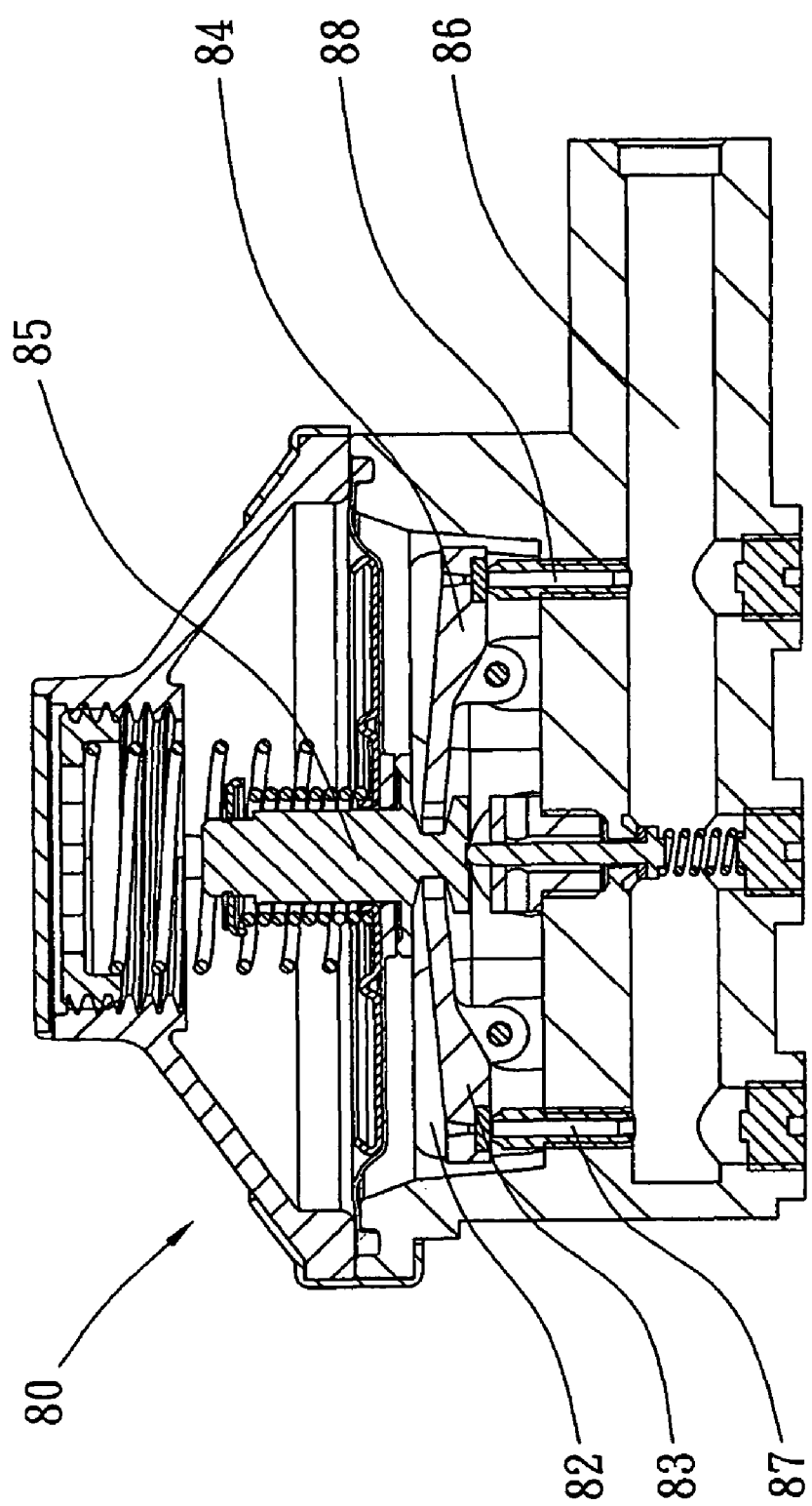
FIG. 4 is a sketch diagram of a second preferred embodiment of the present invention, showing the inside structure.

As shown in FIG. 4, a gas adjuster 80 of the second preferred embodiment of the present invention, which is similar to the first embodiment, except that two swing devices 83 and 84 are provided in a chamber 82 to be connected to a movable shafts 85, and two input bores 87 and 88 in an input channel 86 are associated with the swing devices 83 and 84 respectively.

Figure 5:
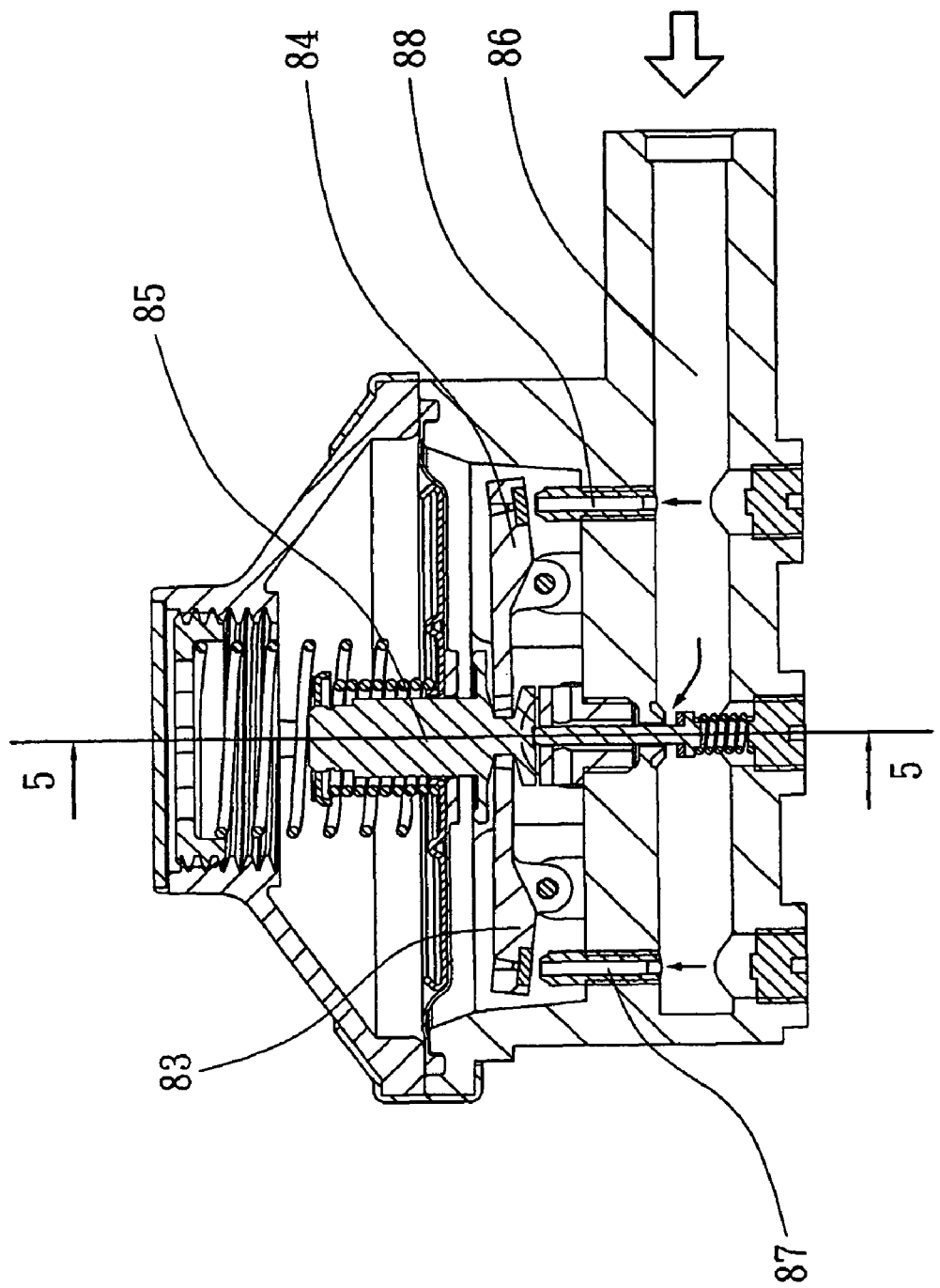
FIG. 5 is a sketch diagram of the second preferred embodiment of the present invention, showing the action of the pressure adjusting mechanism.
Figure 6:
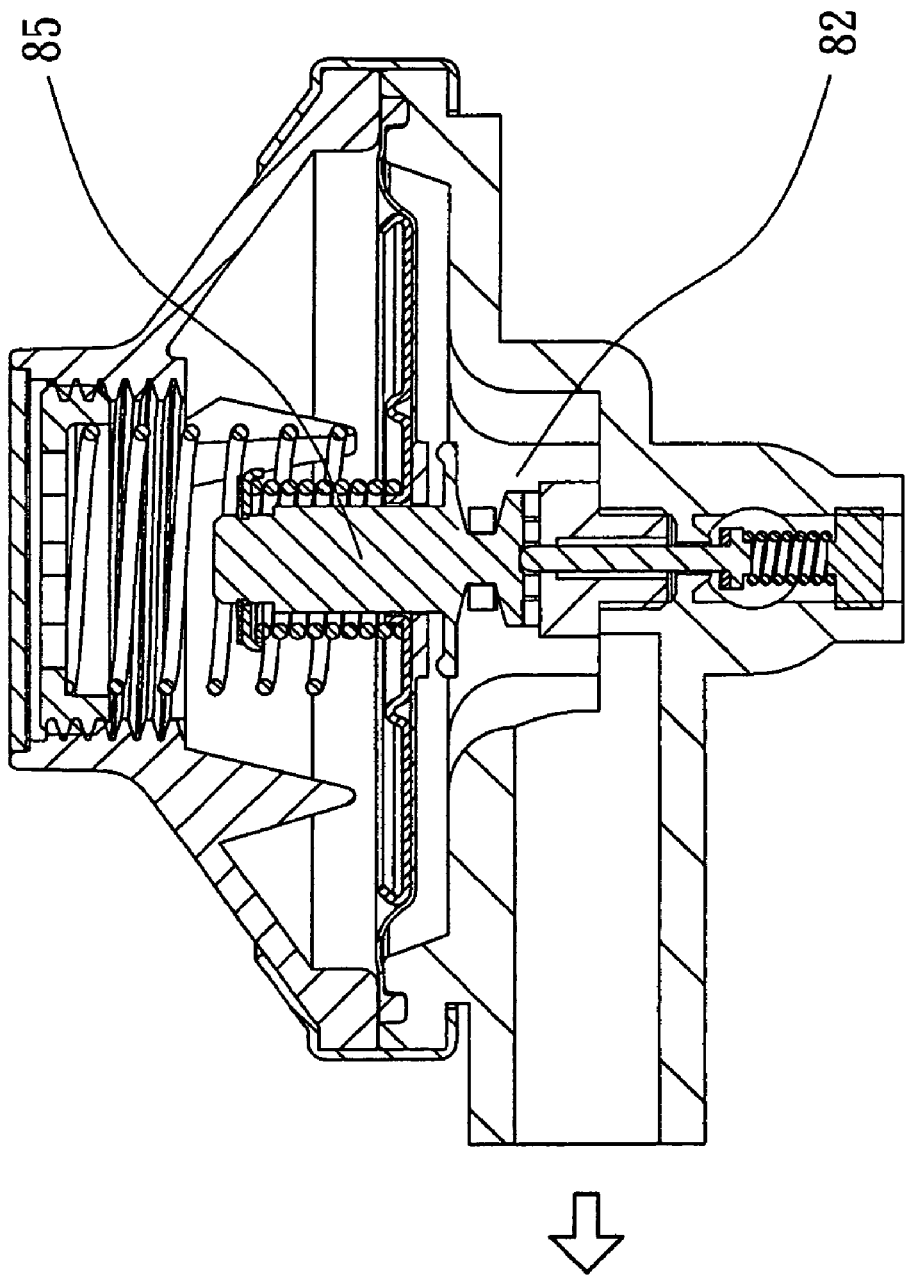
FIG. 6 is a sketch diagram of the second preferred embodiment of the present invention, showing the output condition.

As a result, referring to FIG. 5 and FIG. 6, the gas adjuster 80 of the second preferred embodiment of the present invention has a three-input gas pressure adjusting function.

In conclusion, the gas adjuster of the present invention has a simple structure. Beside that, the present invention provides both functions of positive pressure adjusting and negative pressure adjusting that provides well performances of input pressure reducing, stable output pressure, and stable pressure under high output flow rate to overcome all the drawbacks of the conventional gas adjusters.

The description above is a few preferred embodiments of the present invention and the equivalence of the present invention is still in the scope of the claim of the present invention.

What is claimed is:

1. A multiple-input gas adjuster, comprising:
   a case having a chamber therein, an input channel at an end thereof, an output channel at opposite communicated with the chamber, a first input bore and a second input bore communicated with the input channel and the chamber;
   a pressure adjusting mechanism, which is provided in the chamber of the case, having a film assembly in the case, a movable shaft in the case for reciprocation by the film assembly toward or away from the first input bore, at least a swing device pivoted in the case with an end thereof connected to the movable shaft and an opposite end to be moved to seal the second input bore, and a driving device received in the first input bore and connected to the movable shaft for reciprocation to seal the first input bore;
   a sealing block is provided on the swing device for sealing the second input bore; and
   the pressure adjusting mechanism includes two swing devices, each of which is pivoted in the chamber and connected to the movable shaft, and two second input bores communicated with the input channel and the chamber.

2. The multiple-input gas adjuster as defined in claim 1, wherein the case includes a main member, on which the input channel and the output channel are provided, having an opening at a top thereof and a lid to close the opening of the main member, and the film assembly is provided in the opening of the main member.

3. The multiple-input gas adjuster as defined in claim 2, wherein the film assembly includes an adjusting film and a plate.

4. The multiple-input gas adjuster as defined in claim 2, wherein the pressure adjusting mechanism further includes a positioning base, which is received in the chamber, having a through bore, through which the driving device passes to be connected to the movable shaft, associated with the first bore, and an elastic member urging the driving device and the main member.

5. The multiple-input gas adjuster as defined in claim 4, wherein the driving device includes a shaft received in the first input bore and the through bore, a stop block provided on an end of the shaft to be urged by the elastic member, and a leakage-proof device provided on the shaft and associated with the first input bore.

6. The multiple-input gas adjuster as defined in claim 5, wherein on a sidewall of the first input bore adjoining the input channel is a protrusion to be contacted with the leakage-proof device.

7. The multiple-input gas adjuster as defined in claim 5, further comprising an adjusting button in an adjusting bore of the main member and associated with the first input bore to be urged by the elastic member.

8. The multiple-input gas adjuster as defined in claim 1, wherein the main member includes a through hole communicating the chamber and the input channel, and a ventilation device; the second input bore are provided and received in the through hole for reciprocation to touch the sealing block, an opening associated with the through bore, and a lid closed the opening.

* * * * *